(No Model.) 5 Sheets—Sheet 1.

J. L. BUFORD.
DISTANCE MEASURING INSTRUMENT.

No. 519,319. Patented May 8, 1894.

Witnesses
Percy C. Bowen
John C. Wilson

Inventor
J. L. Buford,
by Whitman & Wilkinson
Attorneys.

THE NATIONAL LITHOGRAPHING COMPANY,
WASHINGTON, D. C.

(No Model.) 5 Sheets—Sheet 2.

J. L. BUFORD.
DISTANCE MEASURING INSTRUMENT.

No. 519,319. Patented May 8, 1894.

Witnesses
Percy C. Bowen.
John C. Wilson.

Inventor
J. L. Buford,
By Whitman & Wilkinson
Attorneys.

(No Model.) 5 Sheets—Sheet 3.
J. L. BUFORD.
DISTANCE MEASURING INSTRUMENT.
No. 519,319. Patented May 8, 1894.
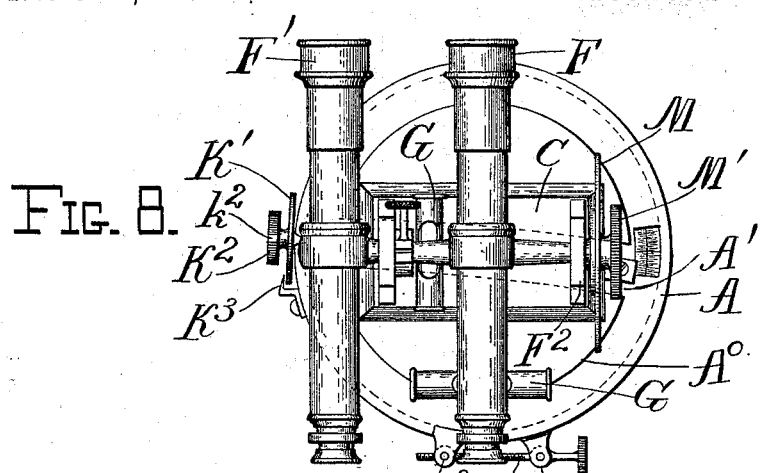
Fig. 8.
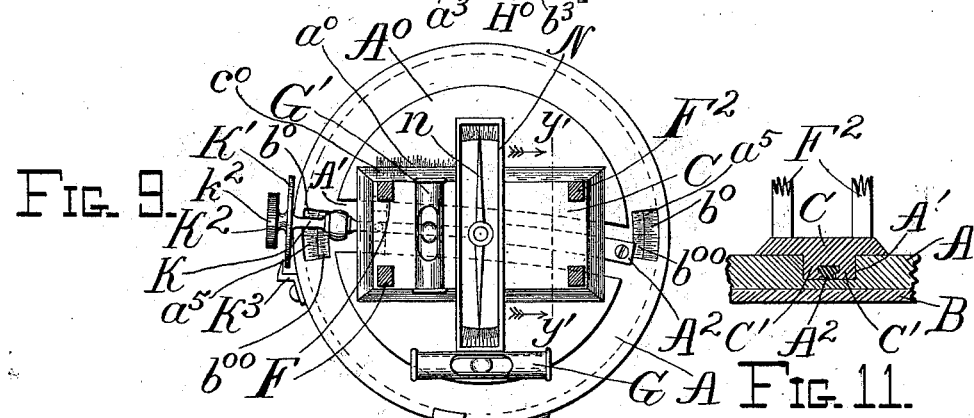
Fig. 9.
Fig. 11.
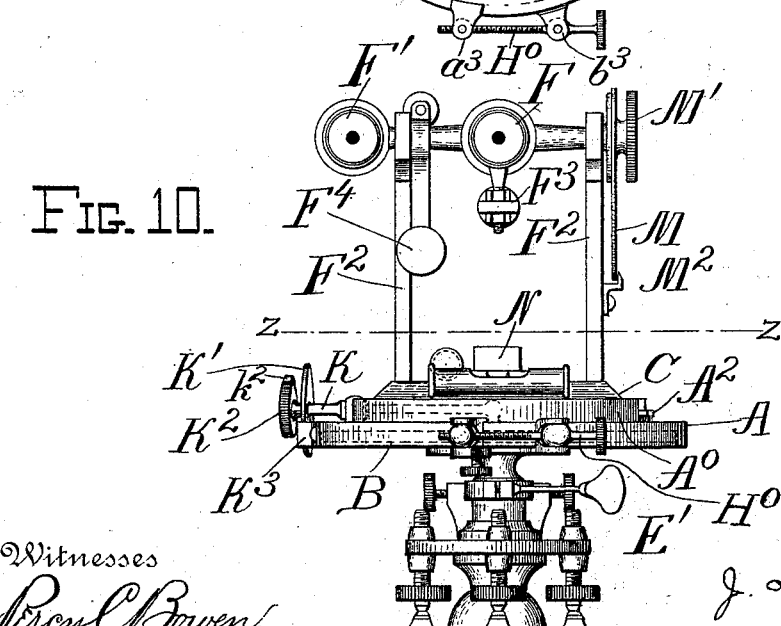
Fig. 10.
Witnesses
Percy C. Bowen
John C. Wilson
Inventor
J. L. Buford
By Whitman + Wilkinson
Attorneys (No Model.)  5 Sheets—Sheet 4.
J. L. BUFORD.
DISTANCE MEASURING INSTRUMENT.

No. 519,319. Patented May 8, 1894.

Witnesses
Percy C. Bowen
John C. Wilson

Inventor
J. L. Buford,
By Whitman & Wilkinson
Attorneys.

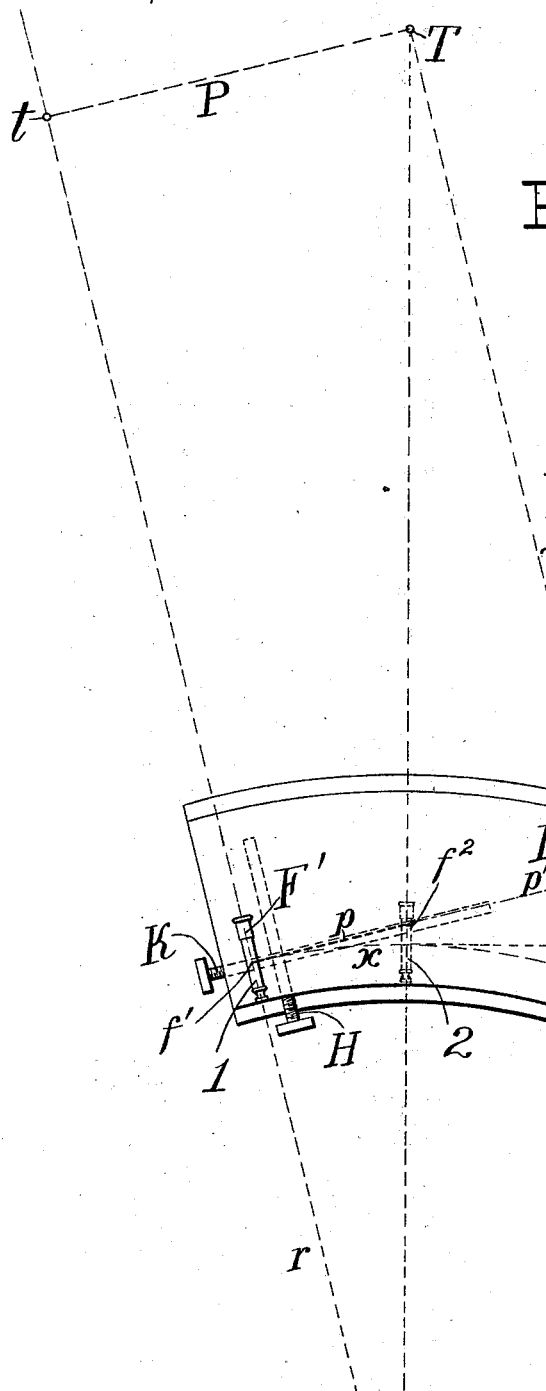

UNITED STATES PATENT OFFICE.

JEFFERSON L. BUFORD, OF BIRMINGHAM, ALABAMA.

DISTANCE-MEASURING INSTRUMENT.

SPECIFICATION forming part of Letters Patent No. 519,319, dated May 8, 1894.

Application filed June 23, 1893. Serial No. 478,624. (No model.)

*To all whom it may concern:*

Be it known that I, JEFFERSON L. BUFORD, a citizen of the United States, residing at Birmingham, in the county of Jefferson and State of Alabama, have invented certain new and useful Improvements in Distance-Measuring Instruments; and I do hereby declare the following to be a full, clear, and exact description of the invention, such as will enable others skilled in the art to which it appertains to make and use the same.

My invention relates to distance measuring instruments, and it consists in providing a simple instrument which is capable of use singly for determining the range or distance of distant objects; or which may be so combined with the ordinary surveyor's transit or theodolite as to determine not only lateral angles and angles of elevation and depression, but also absolute distances.

My invention will be understood after reference to the accompanying drawings, in which the same parts are indicated by the same letters throughout the several views.

Figure 1:
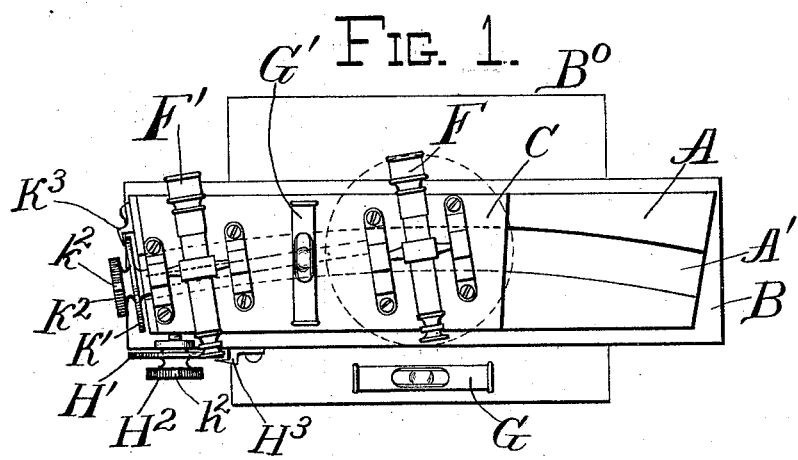
Figure 2:
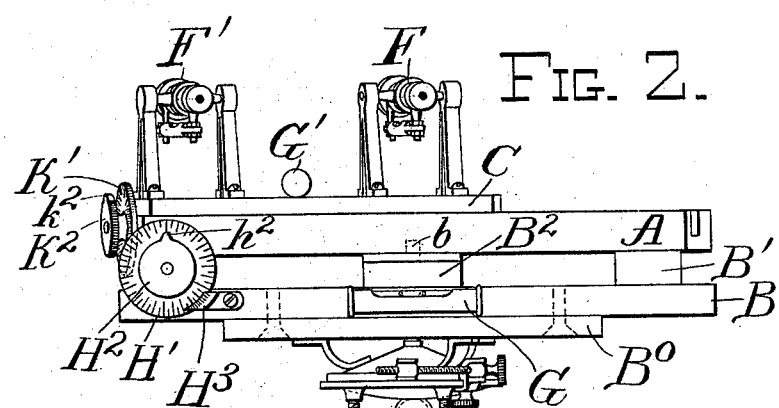
Figure 3:
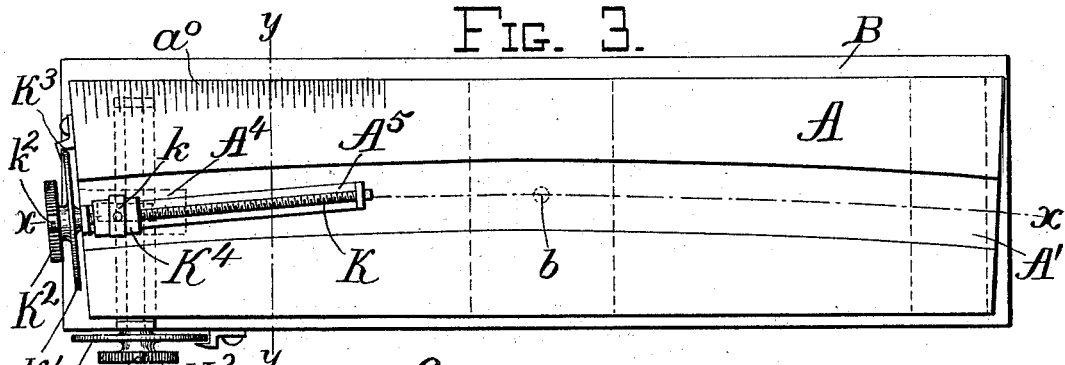
Figure 4:
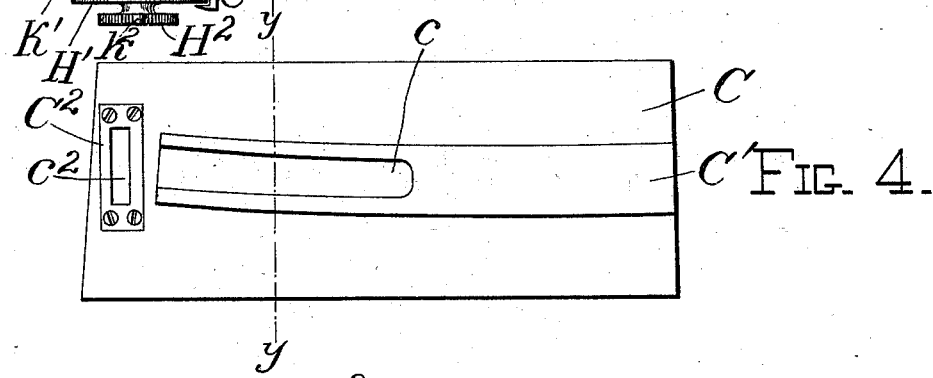
Figures 5, 6:
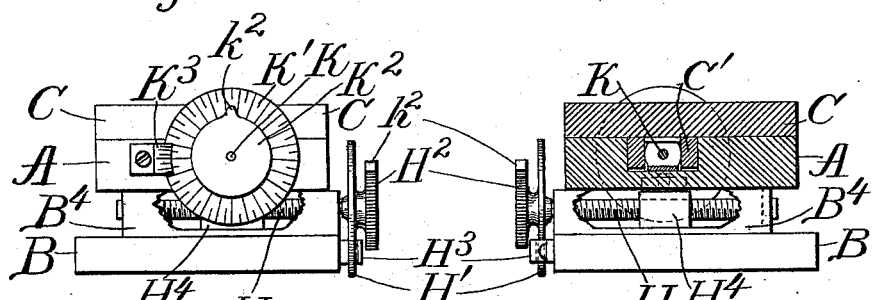
Figure 7:
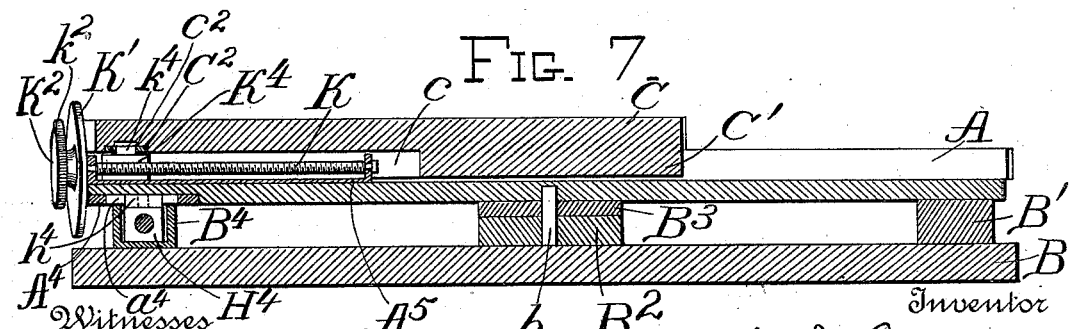
Figure 13:
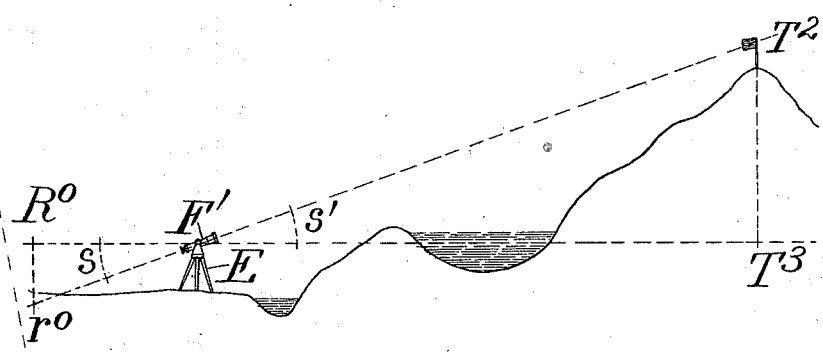
Figure 12:
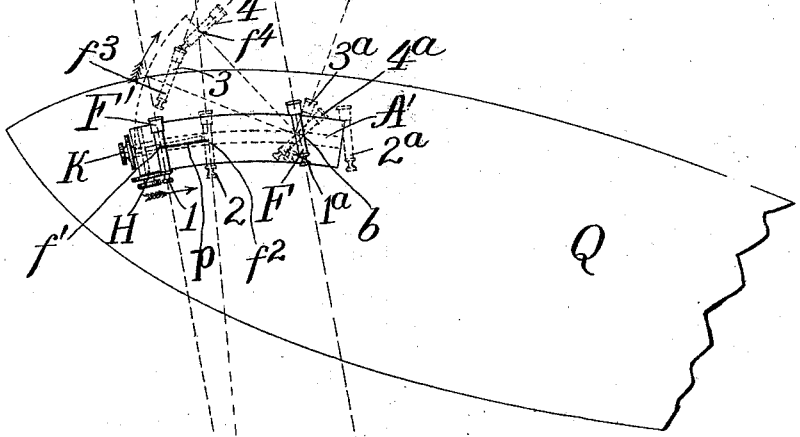

Figure 1 represents a plan view of an ordinary plane table fitted with my improved range finder. Fig. 2 represents a rear elevation of the device shown in Fig. 1. Fig. 3 represents a plan view of the pivoted guide plate and represents the arc shaped groove therein. Fig. 4 represents an inverted plan view of the sliding base plate on which the telescopes are mounted. Fig. 5 represents an end view of the telescope platform as seen from the left of Fig. 2. Fig. 6 represents a section of the telescope platform along the line $y\, y$ of Figs. 3 and 4, the parts shown in detail in the said figure being superimposed as shown in Fig. 5, and parts being broken away. Fig. 7 represents a vertical section along the axis of the arc shaped groove, as along the curved line $x\, x$ of Fig. 3. Fig. 8 represents a plan view of my combined surveyor's transit or theodolite and distance measuring instrument constructed according to my invention. Fig. 9 represents a section along the line $z\, z$ of Fig. 10, looking down. Fig. 10 represents a rear elevation of the instrument shown in Figs. 8 and 9. Fig. 11 represents a section along the line $y'\, y'$ of Fig. 9, and represents in detail the method of preventing the sliding base plate from falling out of its groove should the instrument be turned head downward. Fig. 12 represents a diagrammatic view of my improved range finder as in use on shipboard; and Fig. 13 represents a diagrammatic view of my improved range finder as used in determining horizontal distances. Fig. 14 represents a diagram of a modified form of instrument.

A represents a guide plate provided with a groove A' cut in its upper side with a radius of known length. This groove should be accurately cut, and for convenience in measuring, should preferably have a radius of one hundred feet or some multiple of ten feet, or ten yards, or meters, according to which unit of measurement is to be used. This guide plate is pivoted as at $b$, and rests upon the cross pieces B', B$^2$ and B$^4$, attached to the upper side of the bottom plate B which is secured to the plane table B$^0$ mounted on the tripod E, as shown in Fig. 2, or upon any other suitable support. A washer B$^3$ may be put around the pivot bolt $b$, and protect the upper edge of the cross piece B$^2$ from wear. The rear cross piece or support B$^4$ is made hollow for the screw H and nut H$^4$, hereinafter to be described. The telescope F' is mounted on the sliding plate C, with its longitudinal axis in a vertical plane passing through the center of the circles formed by the curved sides of the arc-shaped groove A', or more definitely speaking, its longitudinal axis lies in a vertical plane passing through the center of the arc $x\, x$ of Fig. 3. The telescope F is also mounted on the sliding plate C but with its longitudinal axis in a vertical plane parallel to the vertical plane passing through the longitudinal axis of the telescope F'. The sliding plate C is provided on its lower side with a curved tongue C' accurately fitting in the arc-shaped groove A'. One end of this tongue may be scored out as shown at $c$ in Fig. 4 in order that the screw K may penetrate farther into the said groove A' and thus give greater scope to the instrument. A plate C$^2$ having slot $c^2$ is secured over a corresponding chamber in the under side of the plate C.

G represents a level attached to the plane table or other support, and G' represents a level attached to the sliding plate C, for the purpose of laying the instrument approximately level.

H represents an adjusting screw revolubly mounted in the hollow supporting piece $B^4$, and engaging in a nut $H^4$ having a lug $h^4$ projecting up into a longitudinal slot $a^4$ in the plate $A^4$, the said lug having a longitudinal play in the said slot, but not being free to move laterally therein. The screw H is provided with a graduated disk $H'$, and a thumb wheel $H^2$, which latter is provided with a pointer $h^2$ by which the operator may either see or feel the number of turns and parts of turns made by the screw H. For exact measurements a vernier $H^3$ is provided for reading the divisions on the disk $H'$. It will be seen that, by turning this thumb wheel $H^2$, the guide plate A may be turned about the pivot $b$.

K represents a screw, set tangent to the arc $xx$ at the initial position of the telescope $F'$. This screw is revolubly mounted in the frame $A^5$ secured to the guide plate A at one end thereof and projects the desired distance into the groove $A'$ and into the hollow portion $c$ of the tongue $C'$. It passes through a nut $K^4$ having a lug $k^4$ fitting in the transverse slot $c^2$ of the plate $C^2$ and having lateral play but no longitudinal play in said slot. This screw K is provided with graduated disk $K'$, thumb wheel $K^2$ with pointer $K^2$, and vernier $K^3$, similar to those described with reference to the screw H. It will be seen that, if the thumb wheel $K^2$ be turned, the sliding plate C will be moved along the arc $A'$, and thus the axis of the telescope $F'$ will *seriatim* assume a position in the vertical planes through consecutive radii of the said arc, while the axis of the telescope F will at all times remain parallel to that of the telescope $F'$.

In order to avoid index error and other corrections it is preferable that the center of the telescope F should be vertically over the axis of the pivot $b$, when the telescope $F'$ is at the zero or initial position.

The distance through which the sliding plate $C^0$ has been moved, may be shown by graduations $a^0$ and $c^0$; or the whole number of turns of the screw K may be read from the scale $a^0$, and the parts of turns from the graduated circle $K'$ and the vernier $K^3$ as may be preferred.

In the device shown in Figs. 8 to 10, the two telescopes are mounted on Y's $F^2$, and carry a level $F^3$ and sector M and vernier $M^2$ to measure vertical angles. $M'$ is a thumb to turn the telescopes about their axes. $F^4$ represents the elevating screw constructed with its attachments in the ordinary way. The sliding plate C also carries a needle box N and magnetic needle $n$. The guide plate A overhangs the azimuth plate B and the graduated arc $b^0$ is read through the glass or mica plates $a^5$ by means of the vernier $b^{00}$. The guide plate A is made thicker along its central portion as at $A^0$, and through the center of this thickened portion the arc-shaped groove $A'$ is cut. In this groove the curved tongue $C'$ of the sliding plate is accurately fitted; and since with this invention the tripod is often thrown carelessly over the shoulders, the curved tenon $A^2$ is made to project from the guide plate A into the base of the tongue $C'$ and thus to hold the plate C and the telescopes mounted thereon secure against becoming accidentally detached from the remainder of the instrument. The screw K, and its various attachments are constructed as already described with reference to Figs. 1 to 7.

The instrument should be so adjusted that the center of the telescope F is exactly over the center of the azimuth circle B when the circle $K'$ is at the zero point. Or the index error being known, whenever it is desired to measure angles the screw K should be so turned as to bring the center of the telescope F over the center of the azimuth circle B. The tangent screw $H^0$ passes through the nuts $a^3$ secured to the guide plate A, and $b^3$ secured to the azimuth plate B, and the azimuth plate being clamped in the approximate position, the guide plate may be readily moved until the telescope points in the exact position desired.

The support $E'$ with its various leveling screws, clamping screws, &c., is well known in the art, and is not a part of my invention.

The operation of the device is as follows:— Suppose the instrument to be fitted on a ship Q, as shown diagrammatically in Fig. 12, and that it be desired to ascertain the distance or "range" of a target T. The telescope F is first brought to bear on the target by swinging the platform first and then using the screw H; when the telescope F is pointed properly, the telescopes will be in the respective positions 1 and $1^a$. When the line of sight of the telescope F bears on a given point of the target, the line of sight of the telescope $F'$ will bear on a point $t$ at a distance P from the first mentioned point; which distance, since the axes of the telescopes are in parallel vertical planes, will be exactly equal to the horizontal distance between the said planes. Now the screw K is turned, from say the zero position, until the line of sight of the telescope $F'$ strikes the point of the target first observed, the telescope $F'$ will now be in the position 2, and the telescope F will be in the position $2^a$. If the angle through which the screw K be turned be noted it will be a known function of the distance $p$ through which the axis of the telescope F has been moved from $f'$ to $f^2$. If $R^0$ be the center of the arc $A'$, the similar triangles $R^0 f' f^2$ and $R^0 t$ T will give the equation $\dfrac{R^0 f'}{p} = \dfrac{R^0 t}{P}$; or if $R^0 f'$ equals $r$ and $R^0 t$ equals R, and D equals distance of target, then we have—

$$\frac{r}{p} = \frac{R}{P} \therefore R = \frac{rP}{p} \text{ and } D = R - r,$$

in which equations $r$ and P are known constants and $p$ is observed. There is a slight error due to the assumption that the distance $f' t$ is equal to $f^2$ T, but this error is exceedingly small. Thus where the distance between the telescopes is ten feet, the target two miles away, and the radius of the arc A' is one hundred feet, the error from this cause would be a small fraction of an inch.

The form of instrument shown diagrammatically in Fig. 14, while less compact, does away with any error except those inherent in instruments due to unavoidable defects in manufacture, the error from this cause however, being slight. Thus from the similar triangles—$R^0 f' f^2$ and $T f^2 b$ we have $$\frac{T b}{b f^2} = \frac{R^0 f'}{f' f^2}$$

or if $D^0$ be the distance of the object from the telescope F, then $$\frac{D^0}{p'} = \frac{r}{p} \therefore D^0 = \frac{r p'}{p} = \frac{P - p \cdot r}{p}.$$

It will be noted that in the diagram shown in Fig. 12, the telescopes are not at right angles to each other and that the distance is measured as from the telescope F'; while in the diagram shown in Fig. 14 the telescopes are at right angles to each other and the distance is measured as from the telescope F.

Since $R = \frac{P}{p} \cdot r$, it follows that if the screw K has such a pitch that $n$ turns will equal the exact distance P, then each turn will give $\frac{P}{p}$ as the distance through which the screw has moved the telescope F' in that turn; and if $m$ indicated the turns and parts of turns made, then—

$$p = \frac{m P}{n} \text{ and } R = \frac{P}{\frac{m P}{n}} \times r = \frac{n}{m} \times r,$$

or $$m = \frac{n r}{R},$$

from all of which equations a table or scale may be readily prepared and when prepared may be rapidly used.

It will be evident that it will be possible to reverse the above mode of procedure and measure the angle the telescope F' is turned back again on the target after sighting both the telescopes on the target as before; in this way personal equations and index errors may be avoided. Since the length of the screw K and the angle through which the sliding block C would be moved would ordinarily be small, for determining the distance of objects at close range, such as T', the instrument is swung around about the pivot $b$ until the line of sight of the telescope F bears upon some distinctive point of the object T', and then by means of the screw H, the telescope F' is sighted at the said point. Thus the telescope F is first brought to the position $3^a$ at which time the telescope F' is in the position 3; now by means of the screw H the telescope F' is swung around to the position 4, the telescope F then pointing as at $4^a$. Now the angle $f^3 b f^4$ is evidently a function of the angle through which the screw H has been turned; also the angle $f^3 b f^4$ is also evidently equal to the angle $f^4 T' b$; and $D = P \cot. f^4 T' b$.

By knowing the number of turns of the screw H necessary to swing the telescopes through $1°, 2°$, &c., and observing the number of turns made by the screw H, the distance D of the target T' may be readily computed. Or a table may be made out ready for use. It is preferable that the relative pitch of the screws H and K should be so adjusted that the angle through which the axis of the telescope F' is moved by one turn of the screw H shall equal some multiple, such as ten, of the angle through which the axis of the same telescope is moved by one turn of the screw K.

Upon inspection of Fig. 13 it will be observed that the distance measured by the herein-described instrument is that along a horizontal plane. Thus suppose the telescope F' be pointed at an object $T^2$ on the top of a hill and that the angle of elevation be $s$, that the platform be level, that $R^0$ be the center of the arc A', and that D be the horizontal distance as before.

$$F' T^2 = D \sec. s \text{ and}$$
$$F' r^0 = r \sec. s$$
$$\frac{F' T^2}{F' r^0} = \frac{D}{r} = \frac{R - r}{r} \text{ and}$$
$$R = \frac{P}{p} \times r$$
$$\therefore D = \frac{P - p \cdot r}{p}$$

which does not in any way depend upon the angle of elevation of the telescopes. The same would hold for depression angles.

It will be obvious that the screws H and K may be placed at different ends of the guide plate A, and that they may be operated by independent operators.

It will be obvious that alidade arms may be substituted for the telescopes if desired.

The various other advantages of my improved instrument will readily suggest themselves to any one skilled in the art.

Having thus described my invention, what I claim, and desire to secure by Letters Patent of the United States, is—

1. In a distance measuring instrument, the combination of two telescopes or sighting instruments arranged with their axes in parallel vertical planes, and means for moving one of said telescopes along the circumference of an arc of known diameter, substantially as and for the purposes described.

2. In a distance measuring instrument, the combination of two telescopes or sighting instruments arranged with their axes in parallel vertical planes, an arc of known diameter perpendicular to the axis of one of said sighting instruments, means for moving said telescopes along said arc, and means for measuring the distance so moved, substantially as and for the purposes described.

3. In a distance measuring instrument, the combination of two telescopes or sighting instruments arranged with their axes in parallel vertical planes, a sliding plate supporting said sighting instruments and provided with an arc-shaped tongue, a guide plate provided with an arc-shaped groove perpendicular to the axis of one of said sighting instruments, and adapted to receive said tongue, and means for moving said sliding plate along said groove, substantially as and for the purposes described.

4. In a distance measuring instrument, the combination of two telescopes or sighting instruments arranged with their axes in parallel vertical planes, a sliding plate supporting said sighting instruments and provided with an arc-shaped tongue, a guide plate provided with an arc-shaped groove perpendicular to the axis of one of said sighting instruments, and adapted to receive said tongue, and a tangent screw adapted to move said arc sliding plate along said arc-shaped groove, and means for measuring the distance the said sliding plate has been moved tangentially, substantially as and for the purposes described.

5. In a distance measuring instrument, the combination of two telescopes or sighting instruments arranged with their axes in parallel vertical planes, a sliding plate supporting said sighting instruments and provided with an arc-shaped tongue, a pivoted guide plate provided with an arc-shaped groove perpendicular to the axis of one of said sighting instruments and adapted to receive said tongue; means for turning said guide plate about its pivot; and means for moving said sliding plate along said groove, substantially as and for the purposes described.

6. In a distance measuring instrument, the combination of two telescopes or sighting instruments arranged with their axes in parallel vertical planes, a sliding plate supporting said sighting instruments and provided with an arc-shaped tongue, a pivoted guide plate provided with an arc-shaped groove perpendicular to the axis of one of said sighting instruments and adapted to receive said tongue; a screw and thumb wheel for turning said guide plate about its pivot; and means for measuring the number of revolutions and fractions thereof that said screw is turned; a tangent screw adapted to move said sliding plate along said arc-shaped groove, and means for measuring the distance the said sliding plate has been moved tangentially, substantially as and for the purposes described.

7. In a distance measuring instrument, the combination with the guide plate A provided with the arc-shaped groove A' and a suitable support for said plate; of the sliding plate C provided with tongue C' registering with said groove, the telescopes F and F' mounted on said sliding plate C and having their axes in parallel vertical planes, the axis of the telescope F' being in a vertical plane passing through the center of said arc; and the screw K for moving said sliding plate along said arc, substantially as and for the purposes described.

8. In a distance measuring instrument, the combination with the pivoted guide plate A provided with the arc-shaped groove A' and a suitable support for said plate, of the sliding plate C provided with tongue C' registering with said groove, the telescopes F and F' mounted on said sliding plate C and having their axes in parallel vertical planes, the axis of the telescope F' being in a vertical plane passing through the center of said arc; the screw H for moving said guide plate about its pivot, and the screw K for moving said sliding plate along said arc, substantially as and for the purposes described.

In testimony whereof I affix my signature in presence of two witnesses.

JEFFERSON L. BUFORD.

Witnesses:
JOHN C. WILSON,
PERCY C. BOWEN.